(12) United States Patent
Kim et al.

(10) Patent No.: US 10,910,162 B2
(45) Date of Patent: *Feb. 2, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Tae Jun Kim, Suwon-si (KR); Jang Yeol Lee, Suwon-si (KR); Jong Ho Lee, Suwon-si (KR); Myung Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,912

(22) Filed: Nov. 1, 2018

(65) Prior Publication Data

US 2020/0075246 A1   Mar. 5, 2020

(30) Foreign Application Priority Data

Sep. 3, 2018   (KR) ........................ 10-2018-0104704

(51) Int. Cl.
*H01G 4/232* (2006.01)
*H01G 4/008* (2006.01)
(Continued)

(52) U.S. Cl.
CPC ......... *H01G 4/2325* (2013.01); *H01G 4/0085* (2013.01); *H01G 4/30* (2013.01); *H01G 4/1227* (2013.01)

(58) Field of Classification Search
CPC ........... H01G 4/30; H01G 4/228; H01G 4/232
See application file for complete search history.

(56) References Cited

U.S. PATENT DOCUMENTS

| 8,988,850 B1 | 3/2015 | Kodam et al. |
| 2016/0093442 A1 | 3/2016 | Nagamoto |

(Continued)

FOREIGN PATENT DOCUMENTS

| JP | 2012-199597 A | 10/2012 |
| JP | 2014-241453 A | 12/2014 |

(Continued)

OTHER PUBLICATIONS

Korean Office Action dated Jul. 1, 2019 issued in Korean Patent Application No. 10-2018-0104704 (with English translation).

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body including dielectric layers and a plurality of internal electrodes disposed to face each other with each of the dielectric layers interposed therebetween; and external electrodes disposed on external surfaces of the ceramic body and electrically connected to the internal electrodes, respectively, wherein the external electrode includes an electrode layer electrically connected to the internal electrodes and a conductive resin layer disposed on the electrode layer, and a sum of thicknesses of the electrode layer and the conductive resin layer in a cross section of the ceramic body in the first and second directions is 12 µm or more.

16 Claims, 4 Drawing Sheets

(51) Int. Cl.
*H01G 4/30* (2006.01)
*H01G 4/12* (2006.01)

(56) References Cited

U.S. PATENT DOCUMENTS

| | | | | |
|---|---|---|---|---|
| 2016/0099106 | A1* | 4/2016 | Kurokawa | H01G 4/0085 |
| | | | | 361/301.4 |
| 2016/0284473 | A1* | 9/2016 | Murosawa | H01G 4/30 |
| 2016/0293331 | A1 | 10/2016 | Kitamura et al. | |
| 2017/0098506 | A1* | 4/2017 | Ando | H01G 4/232 |
| 2017/0365411 | A1* | 12/2017 | Taniguchi | H01G 4/1218 |
| 2018/0061575 | A1* | 3/2018 | Mizuno | H01G 4/0085 |
| 2018/0174753 | A1* | 6/2018 | Terashita | H01G 13/006 |
| 2019/0148070 | A1* | 5/2019 | Kobayashi | H05K 3/3442 |
| | | | | 174/260 |

FOREIGN PATENT DOCUMENTS

| | | | |
|---|---|---|---|
| JP | 2016-189423 A | 11/2016 | |
| KR | 10-2015-0048045 A | 5/2015 | |

\* cited by examiner

II-II'

MULTILAYER CERAMIC ELECTRONIC COMPONENT

CROSS-REFERENCE TO RELATED APPLICATION(S)

This application claims the benefit of priority to Korean Patent Application No. 10-2018-0104704 filed on Sep. 3, 2018 in the Korean Intellectual Property Office, the disclosure of which is incorporated herein by reference in its entirety.

TECHNICAL FIELD

The present disclosure relates to a multilayer ceramic electronic component, and more particularly, to a method of manufacturing a multilayer ceramic electronic component having excellent reliability.

BACKGROUND

Generally, electronic components using a ceramic material, such as a capacitor, an inductor, a piezoelectric element, a varistor, a thermistor, and the like, include a ceramic body formed of the ceramic material, internal electrodes formed in the ceramic body, and external electrodes installed on surfaces of the ceramic body to be connected to the internal electrodes.

A multilayer ceramic capacitor, among multilayer ceramic electronic components, includes a plurality of stacked dielectric layers, internal electrodes disposed to face each other with each of the dielectric layers interposed therebetween, and external electrodes electrically connected to the internal electrodes.

The multilayer ceramic capacitor has been widely used as components of mobile communications devices such as a computer, a personal digital assistant (PDA), a cellular phone, and the like, since it has a small size, implements high capacitance, and may be easily mounted.

Recently, in accordance with performance improvement and thinness and lightness of electrical and electronic devices, a size decrease, performance improvement, and an increase in capacitance of electronic components have been demanded.

Particularly, in accordance with an increase in capacitance and miniaturization of the multilayer ceramic capacitor, technology of significantly increasing capacitance per unit volume has been required.

Therefore, the high capacitance needs to be implemented by significantly decreasing a volume of the internal electrodes while implementing an area of the internal electrodes as much as possible to increase the number of stacked layers.

However, in accordance with the capacitance increase and the miniaturization of the multilayer ceramic capacitor, it has been important to secure reliability, particularly, moisture proof reliability, of the multilayer ceramic capacitor.

SUMMARY

An aspect of the present disclosure may provide a multilayer ceramic electronic component having excellent reliability, and a method of manufacturing the same.

According to an aspect of the present disclosure, a multilayer ceramic electronic component may include: a ceramic body including dielectric layers and a plurality of internal electrodes disposed to face each other with each of the dielectric layers interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on external surfaces of the ceramic body and electrically connected to the internal electrodes, respectively, wherein the external electrode includes an electrode layer electrically connected to the internal electrodes and a conductive resin layer disposed on the electrode layer, and a sum of thicknesses of the electrode layer and the conductive resin layer in a cross section of the ceramic body in the first and second directions is 12 μm or more.

According to another aspect of the present disclosure, a multilayer ceramic electronic component may include: a ceramic body including dielectric layers and a plurality of internal electrodes disposed to face each other with each of the dielectric layers interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on external surfaces of the ceramic body and electrically connected to the internal electrodes, respectively, wherein the external electrode includes an electrode layer electrically connected to the internal electrodes and a conductive resin layer disposed on the electrode layer, and a sum of thicknesses of the electrode layer and the conductive resin layer in a cross section of the ceramic body in the first and third directions is 10 μm or more.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

An exemplary embodiment in the present disclosure relates to a ceramic electronic component, and an example of an electronic component using a ceramic material may include a capacitor, an inductor, a piezoelectric element, a varistor, a thermistor, or the like. Hereinafter, a multilayer ceramic capacitor will be described as an example of the ceramic electronic component.

Figure 1:
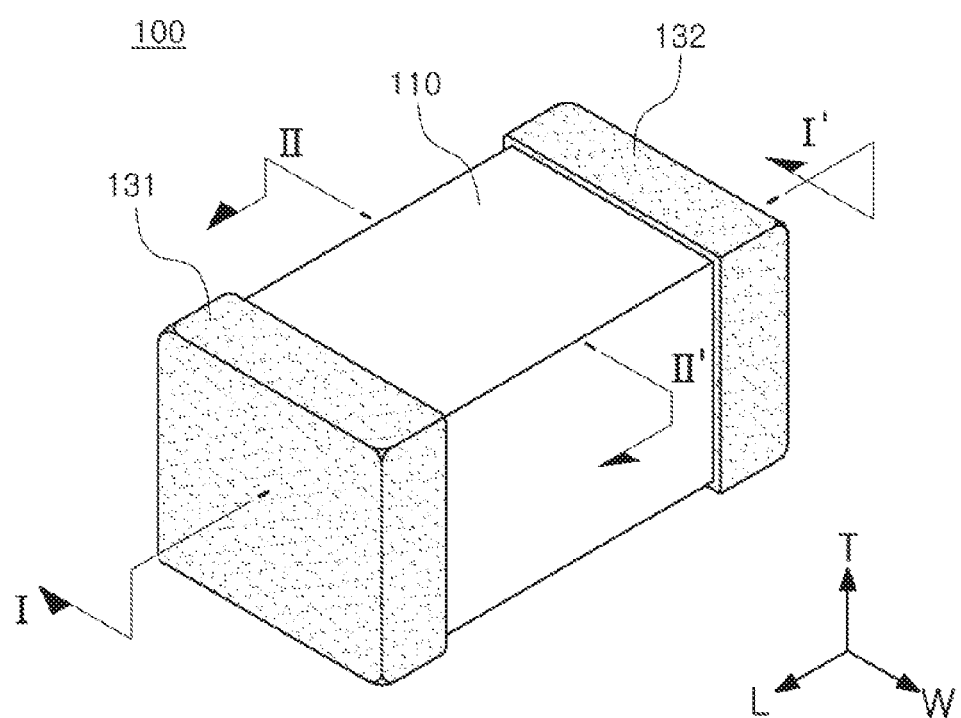
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
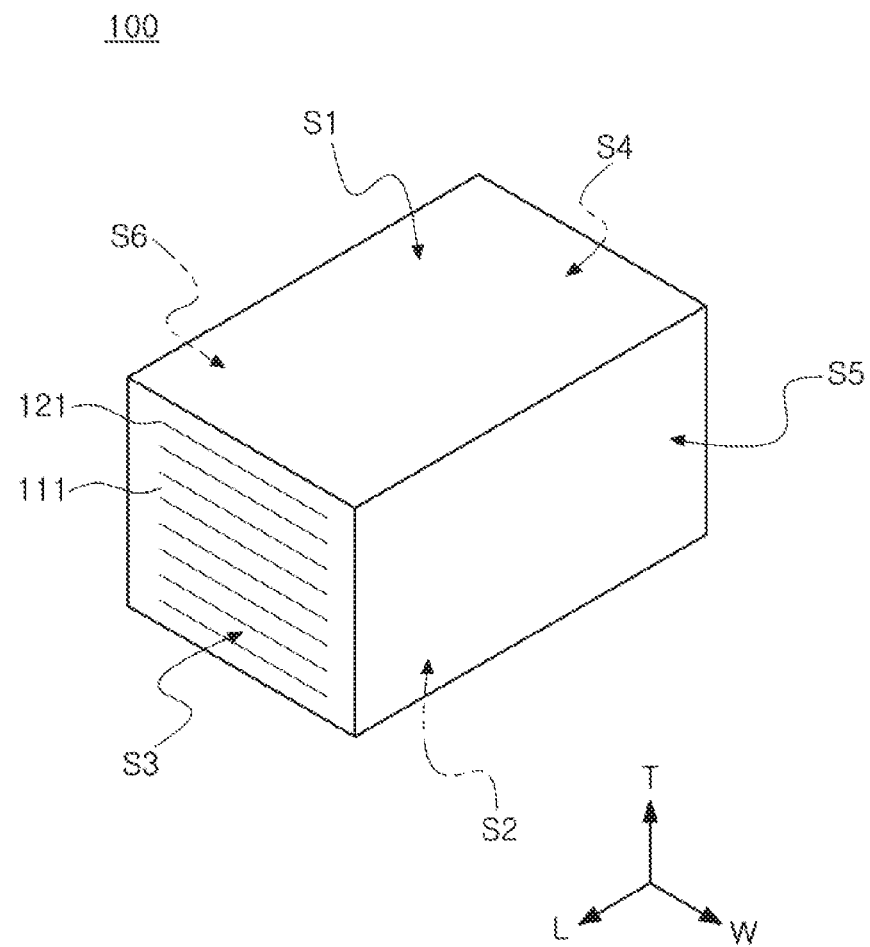
FIG. 2 is a schematic view illustrating a ceramic body according to an exemplary embodiment in the present disclosure.

FIG. 2 is a schematic view illustrating a ceramic body according to an exemplary embodiment in the present disclosure.

Figure 3:
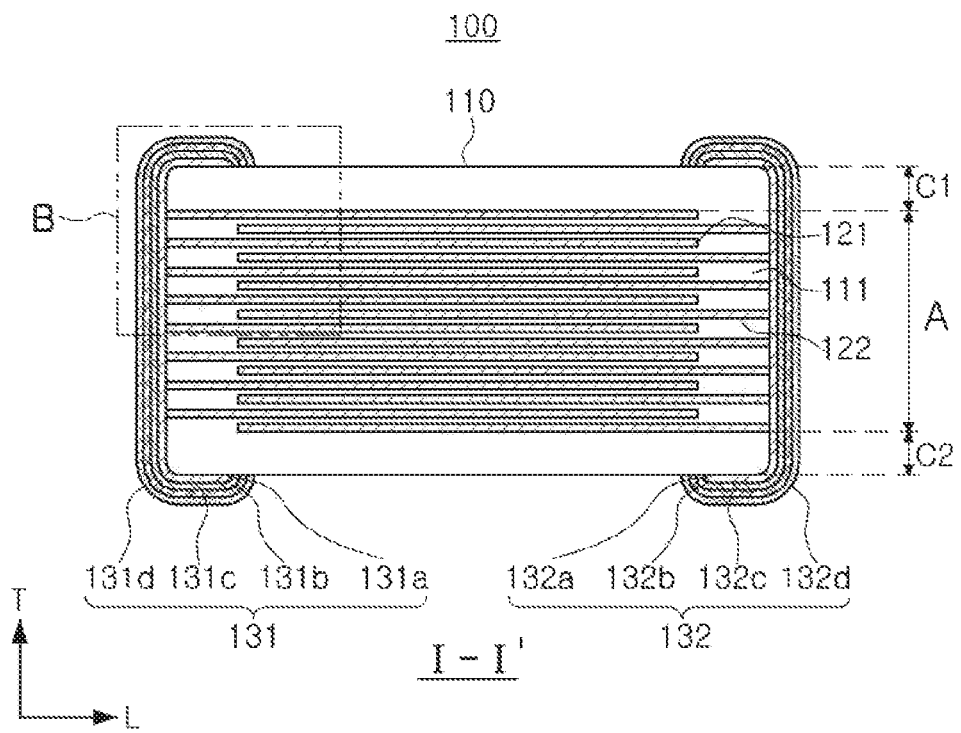
FIG. 3 is a cross-sectional view taken along line I-I' of FIG. 1.

FIG. 3 is a cross-sectional view taken along line I-I' of FIG. 1.

Figure 4:
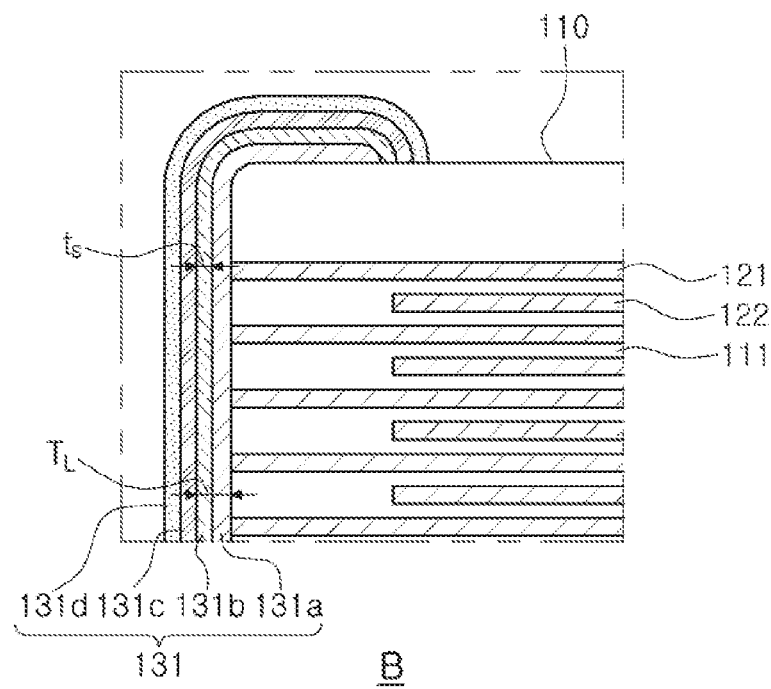
FIG. 4 is an enlarged view of region B of FIG. 3.

FIG. 4 is an enlarged view of region B of FIG. 3.

Referring to FIGS. 1 through 4, a multilayer ceramic capacitor according to an exemplary embodiment in the present disclosure may include a ceramic body 110, internal electrodes 121 and 122 disposed in the ceramic body 110, and external electrodes 131 and 132 disposed on external surfaces of the ceramic body 110.

In an exemplary embodiment in the present disclosure, a 'length direction' of the multilayer ceramic capacitor refers to an 'L' direction of FIG. 1, a 'width direction' of the multilayer ceramic capacitor refers to a 'W' direction of FIG. 1, and a 'thickness direction' of the multilayer ceramic capacitor refers to a 'T' direction of FIG. 1. The 'thickness direction' refers to a direction in which the dielectric layers are stacked, that is, a 'stack direction'.

A shape of the ceramic body 110 is not particularly limited, but may be a hexahedral shape according to an exemplary embodiment in the present disclosure.

The ceramic body 110 may have first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction.

The first and second surfaces S1 and S2 refer to surfaces of the ceramic body 110 opposing each other in the thickness direction, which is the first direction, the third and fourth surfaces S3 and S4 refer to surfaces of the ceramic body 110 opposing each other in the length direction, which is the second direction, and the fifth and sixth surfaces S5 and S6 refer to surfaces of the ceramic body 110 opposing each other in the width direction, which is the third direction.

One ends of a plurality of internal electrodes 121 and 122 disposed in the ceramic body 110 may be exposed to the third surface S3 or the fourth surface S4 of the ceramic body 110.

The internal electrodes 121 and 122 may have a pair of first and second internal electrodes 121 and 122 having different polarities.

One ends of the first internal electrodes 121 may be exposed to the third surface S3, and one ends of the second internal electrodes 122 may be exposed to the fourth surface S4.

The other ends of the first internal electrodes 121 and the second internal electrodes 122 may be disposed to be spaced apart from the fourth surface S4 or the third surface S3 by a predetermined interval. More detailed contents for this will be described below.

First and second external electrodes 131 and 132 may be disposed on the third and fourth surfaces S3 and S4 of the ceramic body 110, respectively, and may be electrically connected to the internal electrodes.

A thickness of each of the internal electrodes 121 and 122 is not particularly limited, and may be, for example, 0.4 μm or less.

According to an exemplary embodiment in the present disclosure, the number of dielectric layers on which the internal electrodes are disposed may be 200 or more.

According to an exemplary embodiment in the present disclosure, the ceramic body 110 may be formed by stacking a plurality of dielectric layers 111.

The plurality of dielectric layers 111 forming the ceramic body 110 may be in a sintered state, and adjacent dielectric layers may be integrated with each other so that boundaries therebetween are not readily apparent.

The dielectric layer 111 may be formed by sintering a ceramic green sheet including ceramic powders.

The ceramic powder is not particularly limited, and may be any ceramic powder that is generally used in the related art.

The ceramic powder may include, for example, a $BaTiO_3$-based ceramic powder, but is not limited thereto.

An example of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-solved in $BaTiO_3$, but is not limited thereto.

In addition, the ceramic green sheet may include a transition metal, rare earth elements, magnesium (Mg), aluminum (Al), or the like, together with the ceramic powders.

A thickness of one dielectric layer 111 may be appropriately changed in accordance with a capacitance design of the multilayer ceramic capacitor.

A thickness of the dielectric layer 111 disposed between two adjacent internal electrode layers after being sintered may be, for example, 0.4 μm or less, but is not limited thereto.

According to an exemplary embodiment in the present disclosure, the thickness of the dielectric layers 111 refers to an average thickness.

The average thickness of the dielectric layers 111 may be measured by an image, captured by a scanning electron microscope (SEM), of a cross section of the ceramic body 110 in the length direction, as illustrated in FIG. 2.

For example, with respect to any dielectric layer extracted from an image, captured by the scanning electron microscope (SEM), of a cross section of the ceramic body 110 cut in a length and thickness L-T direction at a central portion of the ceramic body 110 in the width W direction as illustrated in FIG. 2, thicknesses of the dielectric layer may be measured at thirty points arranged at equal intervals in the length direction to measure an average value thereof.

The thirty points arranged at equal intervals may be measured in a capacitance forming portion that refers to a region in which the internal electrodes 121 and 122 overlap each other.

In addition, when an average thickness of ten or more dielectric layers is measured, the average thickness of the dielectric layers may further be generalized.

The ceramic body 110 may include an active portion A contributing to forming capacitance of the multilayer ceramic capacitor, and upper and lower cover portions C1 and C2 disposed as upper and lower margin portions on upper and lower surfaces of the active portion A, respectively.

The active portion A may be formed by repeatedly stacking a plurality of first and second internal electrodes 121 and 122 with each of the dielectric layers 111 interposed therebetween.

The upper and lower cover portions C1 and C2 may be formed of the same material as that of the dielectric layer 111 and have the same configuration as that of the dielectric layer 111 except that they do not include the internal electrodes.

That is, the upper and lower cover portions C1 and C2 may include a ceramic material such as a barium titanate (BaTiO$_3$)-based ceramic material.

The upper and lower cover portions C1 and C2 may be formed by stacking a single dielectric layer or two or more dielectric layers on the upper and lower surfaces of the active portion A, respectively, in a vertical direction, and may basically serve to prevent damage to the internal electrodes due to physical or chemical stress.

Each of the upper and lower cover portions C1 and C2 may have a thickness of 20 μm or less, but is not necessarily limited thereto.

Recently, in accordance with performance improvement and thinness and lightness of electrical and electronic devices, a size decrease, performance improvement, and an increase in capacitance of electronic components have been demanded. Therefore, the thicknesses of the upper and lower cover portions disposed in the ceramic body as described above have been decreased.

As in an exemplary embodiment in the present disclosure, when each of the upper and lower cover portions C1 and C2 has the thickness of 20 μm or less, the thickness of each of the upper and lower cover portions may be small, such that external moisture and a plating solution may easily permeate into the ceramic body. Therefore, it is likely that a moisture proof reliability defect of the multilayer layer capacitor will occur.

In order to solve such a problem, according to an exemplary embodiment in the present disclosure, the moisture proof reliability of the multilayer layer capacitor may be improved by controlling the sum of thicknesses of electrode layers and conductive resin layers in a cross section of the ceramic body in a length-thickness direction and a cross section of the ceramic body in a width-thickness direction.

That is, in an exemplary embodiment in the present disclosure, a subminiature and high-capacitance multilayer ceramic capacitor, when each of the upper and lower cover portions C1 and C2 has the small thickness of 20 μm or less, the sum of thicknesses of an electrode layer and a conductive resin layer included in the external electrode may be controlled in order to improve the moisture proof reliability.

Therefore, in a multilayer ceramic capacitor according to the related art in which a thickness of each of the upper and lower cover portions C1 and C2 exceeds 20 μm, even though the sum of the thicknesses of the electrode layer and the conductive resin layer in the cross section of the ceramic body in the length-thickness direction and the cross section of the ceramic body in the width-thickness direction are not controlled unlike an exemplary embodiment in the present disclosure, the moisture proof reliability is not problematic.

A material of each of the first and second internal electrodes 121 and 122 is not particularly limited, but may be a conductive paste including one or more of silver (Ag), lead (Pb), platinum (Pt), nickel (Ni), and copper (Cu).

The multilayer ceramic capacitor according to an exemplary embodiment in the present disclosure may include the first external electrode 131 electrically connected to the first internal electrodes 121 and the second external electrode 132 electrically connected to the second internal electrodes 122.

The first and second external electrodes 131 and 132 may be electrically connected to the first and second internal electrodes 121 and 122, respectively, in order to form capacitance, and the second external electrode 132 may be connected to a potential different to a potential to which the first external electrode 131 is connected.

The first and second external electrodes 131 and 132 may be disposed, respectively, on the third and fourth surfaces S3 and S4 of the ceramic body 110 in the length direction, which is the second direction, and may extend to the first and second surfaces S1 and S2 of the ceramic body 110 in the thickness direction, which is the first direction.

The external electrodes 131 and 132 may including, respectively, electrode layers 131a and 132a disposed on the external surfaces of the ceramic body 110 and electrically connected to the internal electrodes 121 and 122, respectively, conductive resin layers 131b and 132b disposed on the electrode layers 131a and 132a, respectively, and plating layers 131c and 131d, and 132c and 132d disposed on the conductive resin layers 131b and 132b, respectively.

The external electrodes 131 and 132 may include the first external electrode 131 and the second external electrode 132 disposed on one surface and the other surface of the ceramic body 110, respectively.

The electrode layers 131a and 132a may include a conductive metal and a glass.

The conductive metal used in the electrode layers 131a and 132a may be any material that may be electrically connected to the internal electrodes in order to form the capacitance, for example, one or more selected from the group consisting of copper (Cu), silver (Ag), nickel (Ni), and alloys thereof.

The electrode layers 131a and 132a may be formed by applying and then sintering a conductive paste prepared by adding glass frit to conductive metal powders.

That is, each of the electrode layers 131a and 132a may be a sintering type electrode formed by sintering the paste including the conductive metal.

The conductive metal included in the electrode layers 131a and 132a may be electrically conducted to the first and second internal electrodes 121 and 122 to implement electrical characteristics.

The glass included in the electrode layers 131a and 132a may serve as a sealing material blocking external moisture together with the conductive metal.

The first external electrode 131 may include a first electrode layer 131a disposed on one surface of the ceramic body 110 in the length direction L, which is the second direction, and electrically connected to the first internal electrodes 121, a first conductive resin layer 131b disposed on the first electrode layer 131a, and first plating layers 131c and 131d disposed on the first conductive resin layer 131b.

In addition, the second external electrode 132 may include a second electrode layer 132a disposed on the other surface of the ceramic body 110 in the length direction L, which is the second direction, and electrically connected to the second internal electrodes 122, a second conductive resin layer 132b disposed on the second electrode layer 132a, and second plating layers 132c and 132d disposed on the second conductive resin layer 132b.

The electrode layers 131a and 132a may be disposed on opposite end surfaces of the ceramic body 110 in the length direction, respectively, and extend to portions of the first and second surfaces S1 and S2, which are upper and lower surfaces of the ceramic body 110.

In addition, the conductive resin layers 131b and 132b may be disposed on the electrode layers 131a and 132a, respectively, and the plating layers 131c and 131d, and 132c and 132d may be disposed on the conductive resin layers 131b and 132b, respectively.

The conductive resin layers 131b and 132b and the plating layers 131c, 131d, 132c, and 132d may extend to portions of the first and second surfaces S1 and S2, which are the upper and lower surfaces of the ceramic body 110.

The electrode layers 131a and 132a may be formed of the same conductive metal as that of the first and second internal electrodes 121 and 122, but are not limited thereto. For example, the electrode layers 131a and 132a may be formed of copper (Cu), silver (Ag), nickel (Ni), or alloys thereof.

The conductive resin layers 131b and 132b may be disposed on the electrode layers 131a and 132a, respectively, and may be disposed to completely cover the electrode layers 131a and 132a, respectively.

A base resin included in each of the conductive resin layers 131b and 132b may have a bonding property and a shock absorbing property, may be any resin that may be mixed with conductive metal powders to form a paste, and may include, for example, an epoxy-based resin.

A conductive metal included in each of the conductive resin layers 131b and 132b may be any material that may be electrically connected to the electrode layers 131a and 132a, and may include, for example, one or more selected from the group consisting of copper (Cu), silver (Ag), nickel (Ni), and alloys thereof.

The plating layers 131c, 131d, 132c, and 132d may include nickel plating layers 131c and 132c and tin plating layers 131d and 132d each disposed on the nickel plating layers 131c and 132c, but are limited thereto.

According to an exemplary embodiment in the present disclosure, the sum $T_L$ of thicknesses of each of the electrode layers 131a and 132a and each of the conductive resin layers 131b and 132b in a cross section of the ceramic body 110 in the first and second directions may be 12 μm or more.

The first direction of the ceramic body 110 refers to the thickness direction of the ceramic body 110, the second direction of the ceramic body 110 refers to the length direction of the ceramic body 110, and the cross section of the ceramic body 110 in the first and second directions refers to a cross section of the ceramic body 110 in the length-thickness direction.

The sum $T_L$ of the thicknesses of each of the electrode layers 131a and 132a and each of the conductive resin layers 131b and 132b in the cross section of the ceramic body 110 in the first and second directions may be controlled to be 12 μm or more to improve the moisture proof reliability of the multilayer ceramic electronic component.

That is, in order to prevent a decrease in the moisture proof reliability of the multilayer ceramic electronic component, the sum $T_L$ of the thicknesses of each of the electrode layers 131a and 132a and each of the conductive resin layers 131b and 132b in the cross section of the ceramic body 110 in the first and second directions needs to be at least 12 μm or more.

Particularly, in a product in which the dielectric layer and the internal electrodes formed of thin films are used, such as a product in which a thickness of the dielectric layer 111 after being sintered is 0.4 μm or less and a thickness of each of the first and second internal electrodes 121 and 122 after being sintered is 0.4 μm or less, a decrease in the moisture proof reliability may be problematic.

Therefore, when the thickness of the dielectric layer 111 is 0.4 μm or less and the thickness of each of the first and second internal electrodes 121 and 122 is 0.4 μm or less, the sum $T_L$ of the thicknesses of each of the electrode layers 131a and 132a and each of the conductive resin layers 131b and 132b in the cross section of the ceramic body 110 in the first and second directions needs to be controlled to be 12 μm or more as in an exemplary embodiment in the present disclosure, in order to prevent the decrease in the moisture proof reliability.

When the sum $T_L$ of the thicknesses of each of the electrode layers 131a and 132a and each of the conductive resin layers 131b and 132b in the cross section of the ceramic body 110 in the first and second directions is less than 12 μm, the moisture proof reliability of the multilayer ceramic electronic component may be decreased.

Particularly, in a case in which the thickness of the dielectric layer 111 is 0.4 μm or less and the thickness of each of the first and second internal electrodes 121 and 122 is 0.4 μm or less, when the sum $T_L$ of the thicknesses of each of the electrode layers 131a and 132a and each of the conductive resin layers 131b and 132b in the cross section of the ceramic body 110 in the first and second directions is less than 12 μm, the moisture proof reliability of the multilayer ceramic electronic component may be decreased.

However, the thin films do not mean that the thicknesses of the dielectric layer 111 and the first and second internal electrodes 121 and 122 are 0.4 μm or less, but may conceptually include that the thicknesses of the dielectric layer and the internal electrodes are smaller than those of the multilayer ceramic capacitor according to the related art.

According to an exemplary embodiment in the present disclosure, a thickness $t_s$ of each of the conductive resin layers 131b and 132b may be 2 μm or more.

When the thickness is of each of the conductive resin layers 131b and 132b is less than 2 μm, the thickness of each of the conductive resin layers 131b and 132b absorbing tensile stress generated in a mechanical or thermal environment to prevent occurrence of a crack may be small, such that a decrease in reliability such as warpage, a crack, or the like, may occur.

Meanwhile, each of the conductive resin layers 131b and 132b needs to secure a minimum thickness of 2 μm or more, but when the thickness of each of the conductive resin layers 131b and 132b is excessively great, a moisture permeability rate of a material itself such as the base resin included in each of the conductive resin layers 131b and 132b may be significantly high, such that a moisture proof defect may occur. Therefore, an upper limit value of the thickness of each of the conductive resin layers 131b and 132b may be determined at a level that prevents the decrease in the moisture proof reliability.

Meanwhile, as the sum $T_L$ of the thicknesses of each of the electrode layers 131a and 132a and each of the conductive resin layers 131b and 132b in the cross section of the ceramic body 110 in the first and second directions is increased from a value of 12 μm or more, the moisture proof reliability of the multilayer ceramic electronic component may be improved, but there may be limitation values in the thicknesses of each of the electrode layers 131a and 132a and each of the conductive resin layers 131b and 132b for implementing a subminiature and high-capacitance multilayer ceramic electronic component. Therefore, separate upper limit values of the thicknesses of each of the electrode layers 131a and 132a and each of the conductive resin layers 131b and 132b are not limited herein.

Figure 5:
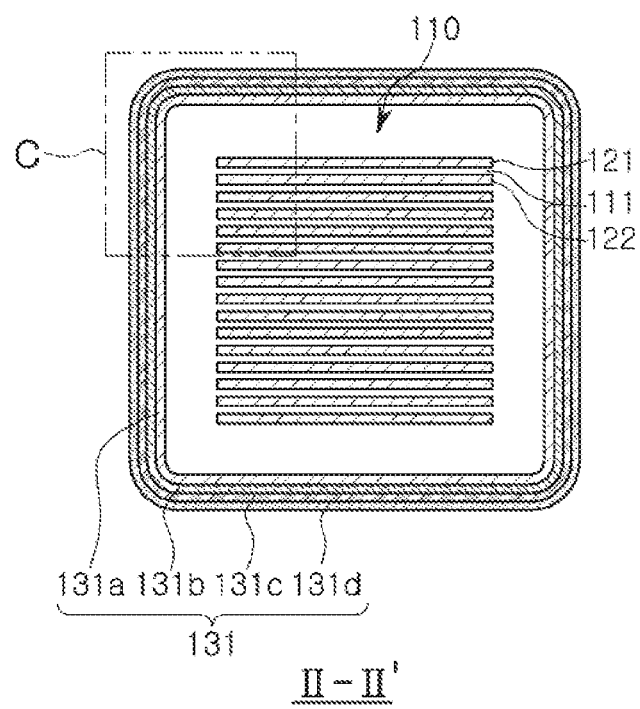
FIG. 5 is a cross-sectional view taken along line II-II' of FIG. 1.

FIG. 5 is a cross-sectional view taken along line II-II' of FIG. 1.

Figure 6:
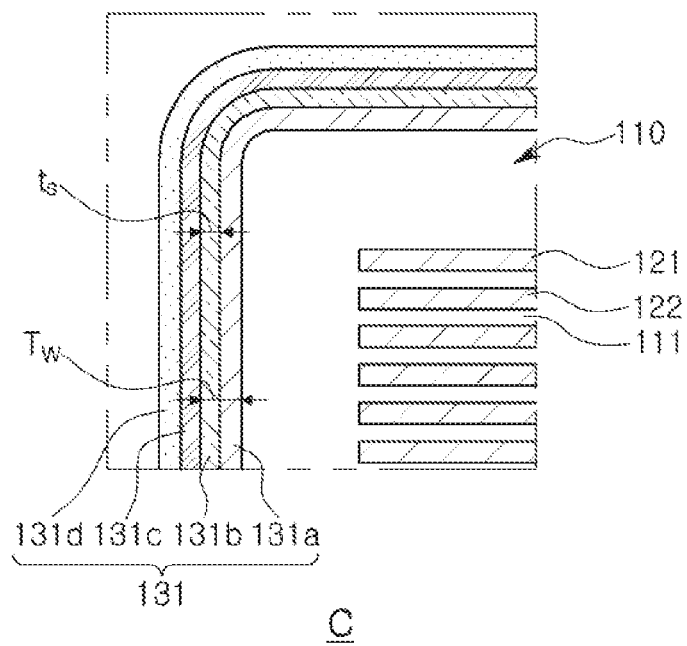
FIG. 6 is an enlarged view of region C of FIG. 5.

FIG. 6 is an enlarged view of region C of FIG. 5.

Referring to FIGS. 5 and 6, in the multilayer ceramic electronic component 100 according to an exemplary embodiment in the present disclosure, in addition to the feature described above, the sum $T_W$ of thicknesses of each of the electrode layers 131a and 132a and each of the conductive resin layers 131b and 132b in a cross section of the ceramic body 110 in the first and third directions may be 10 µm.

The first direction of the ceramic body 110 refers to the thickness direction of the ceramic body 110, the third direction of the ceramic body 110 refers to the width direction of the ceramic body 110, and the cross section of the ceramic body 110 in the first and third directions refers to a cross section of the ceramic body 110 in the width-thickness direction.

The sum $T_W$ of the thicknesses of each of the electrode layers 131a and 132a and each of the conductive resin layers 131b and 132b in the cross section of the ceramic body 110 in the first and third directions may be controlled to be 10 µm or more to improve the moisture proof reliability of the multilayer ceramic electronic component.

That is, in order to prevent a decrease in the moisture proof reliability of the multilayer ceramic electronic component, the sum $T_W$ of the thicknesses of each of the electrode layers 131a and 132a and each of the conductive resin layers 131b and 132b in the cross section of the ceramic body 110 in the first and third directions needs to be at least 10 µm or more.

Particularly, in the product in which the dielectric layer and the internal electrodes formed of the thin films are used, such as the product in which a thickness of the dielectric layer 111 after being sintered is 0.4 µm or less and a thickness of each of the first and second internal electrodes 121 and 122 after being sintered is 0.4 µm or less, a decrease in the moisture proof reliability may be problematic.

Therefore, when the thickness of the dielectric layer 111 is 0.4 µm or less and the thickness of each of the first and second internal electrodes 121 and 122 is 0.4 µm or less, the sum $T_W$ of the thicknesses of each of the electrode layers 131a and 132a and each of the conductive resin layers 131b and 132b in the cross section of the ceramic body 110 in the first and third directions needs to be controlled to be 10 µm or more as in an exemplary embodiment in the present disclosure, in order to prevent the decrease in the moisture proof reliability.

When the sum $T_W$ of the thicknesses of each of the electrode layers 131a and 132a and each of the conductive resin layers 131b and 132b in the cross section of the ceramic body 110 in the first and third directions is less than 10 µm, the moisture proof reliability of the multilayer ceramic electronic component may be decreased.

Particularly, in a case in which the thickness of the dielectric layer 111 is 0.4 µm or less and the thickness of each of the first and second internal electrodes 121 and 122 is 0.4 µm or less, when the sum $T_W$ of the thicknesses of each of the electrode layers 131a and 132a and each of the conductive resin layers 131b and 132b in the cross section of the ceramic body 110 in the first and third directions is less than 10 µm, the moisture proof reliability of the multilayer ceramic electronic component may be decreased.

Meanwhile, as the sum of the thicknesses of each of the electrode layers 131a and 132a and each of the conductive resin layers 131b and 132b in the cross section of the ceramic body 110 in the first and third directions is increased from a value of 10 µm or more, the moisture proof reliability of the multilayer ceramic electronic component may be improved, but there may be limitation values in the thicknesses of each of the electrode layers 131a and 132a and each of the conductive resin layers 131b and 132b for implementing a subminiature and high-capacitance multilayer ceramic electronic component. Therefore, separate upper limit values of the thicknesses of each of the electrode layers 131a and 132a and each of the conductive resin layers 131b and 132b are not limited herein.

According to an exemplary embodiment in the present disclosure, in the product in which the dielectric layer and the internal electrodes formed of the thin films are used, such as the product in which the thickness of the dielectric layer 111 after being sintered is 0.4 µm or less and the thickness of each of the first and second internal electrodes 121 and 122 after being sintered is 0.4 µm or less, the sum $T_L$ of the thicknesses of each of the electrode layers 131a and 132a and each of the conductive resin layers 131b and 132b in the cross section of the ceramic body 110 in the first and second directions may be 12 µm or more and the sum $T_W$ of the thicknesses of each of the electrode layers 131a and 132a and each of the conductive resin layers 131b and 132b in the cross section of the ceramic body 110 in the first and third directions may be 10 µm or more, in order to improve the moisture proof reliability.

That is, when the sum $T_L$ of the thicknesses of each of the electrode layers 131a and 132a and each of the conductive resin layers 131b and 132b in the cross section of the ceramic body 110 in the first and second directions is 12 µm or more and the sum $T_W$ of the thicknesses of each of the electrode layers 131a and 132a and each of the conductive resin layers 131b and 132b in the cross section of the ceramic body 110 in the first and third directions is 10 µm or more, a moisture permeability rate may be decreased, such that the moisture proof reliability may be improved.

That is, when any one of the sum $T_L$ of the thicknesses of each of the electrode layers 131a and 132a and each of the conductive resin layers 131b and 132b in the cross section of the ceramic body 110 in the first and second directions and the sum $T_W$ of the thicknesses of each of the electrode layers 131a and 132a and each of the conductive resin layers 131b and 132b in the cross section of the ceramic body 110 in the first and third directions is out of a numeral range of the present disclosure, the moisture proof reliability may be decreased.

A method of manufacturing a multilayer ceramic capacitor according to an exemplary embodiment in the present disclosure will hereinafter be described.

According to an exemplary embodiment in the present disclosure, a plurality of ceramic green sheets may be prepared.

The ceramic green sheet may be manufactured by mixing ceramic powders, a binder, a solvent, and the like, with one another to prepare slurry and manufacturing the slurry in a sheet shape having a thickness of several micrometers by a doctor blade method. Then, the ceramic green sheet may be sintered to form one dielectric layer 111 as illustrated in FIG. 2.

A thickness of the ceramic green sheet may be 0.6 µm or less. Therefore, a thickness of the dielectric layer after being sintered may be 0.4 µm or less.

Then, a conductive paste for an internal electrode may be applied to the ceramic green sheets to form internal electrode patterns. The internal electrode patterns may be formed by a screen printing method or a gravure printing method.

The conductive paste for an internal electrode may include a conductive metal and an additive. The additive may be one or more of a non-metal or a metal oxide.

The conductive metal may include nickel. The additive may include barium titanate or strontium titanate as the metal oxide.

A thickness of the internal electrode pattern may be 0.5 µm or less. Therefore, a thickness of the internal electrode after being sintered may be 0.4 µm or less.

Then, the ceramic green sheets on which the internal electrode patterns are disposed may be stacked and pressed in the stack direction. Therefore, a ceramic laminate in which the internal electrode patterns are formed may be manufactured.

Then, the ceramic laminate may be cut per region corresponding to one capacitor to be manufactured in a chip form.

In this case, the ceramic laminate may be cut so that one ends of the internal electrode patterns are alternately exposed through end surfaces.

Then, the laminate manufactured in the chip form may be sintered to manufacture the ceramic body.

The sintering process may be performed in a reducing atmosphere. In addition, the sintering process may be performed while controlling a temperature raising speed. The temperature raising speed may be 30° C./60 s to 50° C./60 s at 700° C. or less.

Then, the external electrodes covering the end surfaces of the ceramic body and electrically connected to the internal electrodes exposed to the end surfaces of the ceramic body may be formed. Then, plating layers formed of nickel, tin, or the like, may be disposed on surfaces of the external electrodes.

Hereinafter, the present disclosure will be described in detail with reference to Inventive Example and Comparative Example.

Multilayer ceramic capacitors according to Inventive Examples and multilayer ceramic capacitors according to Comparative Examples were prepared by the following method.

Barium titanate powders, ethanol as an organic solvent, and polyvinyl butyral as a binder were mixed with one another and were ball-milled to prepare slurry. Then, a ceramic green sheet was manufactured using the slurry.

A conductive paste for an internal electrode containing nickel was printed on the ceramic green sheets to form the internal electrodes, and a green laminate formed by stacking the ceramic green sheets was isostatically pressed at 85° C. and at a pressure of 1,000 kgf/cm$^2$.

The pressed green laminate was cut to manufacture a green chip, a de-binder process in which the cut green ship is maintained at 230° C. under an atmospheric condition for 60 hours was performed, and the green chip was sintered at 1000° C. to manufacture a sintered chip. The sintering was performed in a reducing atmosphere to prevent oxidation of the internal electrodes, and the reducing atmosphere was $10^{-11}$ to $10^{-10}$ atm lower than Ni/NiO equilibrium oxygen partial pressure.

Electrode layers were disposed on external surfaces of the sintered chip using a paste for an external electrode including copper powders and glass powders, conductive resin layers were formed on the electrode layers using a conductive paste including copper powders and an epoxy resin, and nickel plating layers and tin plating layers were disposed on the conductive resin layers through electroplating.

A multilayer ceramic capacitor having a 0603 size was manufactured by the abovementioned method. The 0603 size may have a length and a width of 0.6 µm±0.1 µm and 0.3 µm±0.1 µm, respectively. Features of the multilayer ceramic capacitor were evaluated as follows.

Table 1 illustrates measurement results of moisture permeability rates depending on the sums $T_L$ and $T_W$ of the thicknesses of each of the electrode layers 131a and 132a and each of the conductive resin layers 131b and 132b according to Comparative Examples and Inventive Examples.

Measurement of the moisture permeability rates was performed at each thickness on four hundred samples with respect to each of Comparative Examples and Inventive Examples.

TABLE 1

| | Sum TL (µm) of Thicknesses of Electrode Layer and Conductive Resin Layer in Length Direction | Sum TW (µm) of Thicknesses of Electrode Layer and Conductive Resin Layer in Width Direction | Number of Reliability Defects |
|---|---|---|---|
| 1* | 7 | 6 | 15/400 |
| 2* | 7 | 10 | 12/400 |
| 3* | 7 | 12 | 13/400 |
| 4* | 10 | 6 | 4/400 |
| 5* | 10 | 10 | 1/400 |
| 6* | 10 | 12 | 1/400 |
| 7* | 12 | 6 | 2/400 |
| 8 | 12 | 10 | 0/400 |
| 9 | 12 | 12 | 0/400 |
| 10* | 17 | 6 | 1/400 |
| 11 | 17 | 10 | 0/400 |
| 12 | 17 | 12 | 0/400 |
| 13* | 22 | 6 | 1/400 |
| 14 | 22 | 10 | 0/400 |
| 15 | 22 | 12 | 0/400 |

*Comparative Example

It may be seen from Table 1 that in Samples 1 to 6, which are Comparative Examples in which the sums $T_L$ of the thicknesses of each of the electrode layers 131a and 132a and each of the conductive resin layers 131b and 132b in the cross section of the ceramic body 110 in the first and second directions are less than 12 µm, a moisture proof reliability defect occurs regardless of the sums $T_W$ of the thicknesses of each of the electrode layers 131a and 132a and each of the conductive resin layers 131b and 132b in the cross section of the ceramic body 110 in the first and third directions.

In addition, it may be seen that in Sample 7, which is a Comparative Example in which the sum $T_L$ of the thicknesses of each of the electrode layers 131a and 132a and each of the conductive resin layers 131b and 132b in the cross section of the ceramic body 110 in the first and second directions is 12 µm or more, but the sum $T_W$ of the thicknesses of each of the electrode layers 131a and 132a and each of the conductive resin layers 131b and 132b in the cross section of the ceramic body 110 in the first and third directions is less than 10 µm, there is a problem in the moisture proof reliability.

On the other hand, it may be seen that in Samples 8, 9, 11, 12, 14, and 15, which are Inventive Examples in which the sums $T_L$ of the thicknesses of each of the electrode layers 131a and 132a and each of the conductive resin layers 131b and 132b in the cross section of the ceramic body 110 in the first and second directions and the sums $T_W$ of the thicknesses of each of the electrode layers 131a and 132a and each of the conductive resin layers 131b and 132b in the cross section of the ceramic body 110 in the first and third directions are in a numerical range of the present disclosure, a high-capacitance multilayer ceramic capacitor having excellent moisture proof reliability may be implemented.

Meanwhile, it may be seen that in Samples 10 and 13, which are Comparative Examples in which the sums $T_L$ of the thicknesses of each of the electrode layers 131a and 132a and each of the conductive resin layers 131b and 132b in the cross section of the ceramic body 110 in the first and second directions are 17 µm and 22 µm, which are 12 µm or more, but the sums $T_W$ of the thicknesses of each of the electrode layers 131a and 132a and each of the conductive resin layers 131b and 132b in the cross section of the ceramic body 110 in the first and third directions are less than 10 µm, there is a problem in the moisture proof reliability.

As set forth above, according to an exemplary embodiment in the present disclosure, a thickness of a sintered electrode layer including the conductive metal and the glass in the external electrode may be controlled to improve moisture proof characteristics, resulting in improvement of reliability of the multilayer ceramic electronic component.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including an active portion having a plurality of internal electrodes disposed to face each other with dielectric layers interposed therebetween to form capacitance, and upper and lower cover portions respectively disposed above an uppermost internal electrode and below a lowermost internal electrode of the plurality of internal electrodes in a first direction, the ceramic body having first and second surfaces opposing each other in the first direction, third and fourth surfaces opposing each other in a second direction and connected to the first and second surfaces, and fifth and sixth surfaces opposing each other in a third direction and connected to the first to fourth surfaces; and
external electrodes respectively disposed on the third and fourth surfaces of the ceramic body and each electrically connected to respective internal electrodes of the plurality of internal electrodes exposed through the third or fourth surfaces of the ceramic body, respectively,
wherein each of the external electrodes includes an electrode layer electrically connected to the respective internal electrodes and a conductive resin layer disposed on the electrode layer, the conductive resin layer extending onto the fifth or sixth surface of the ceramic body,
a sum of maximum thicknesses of the electrode layer and the conductive resin layer on the third or fourth surface of the ceramic body in a cross section of the ceramic body in the first and second directions is 12 µm or more,
a thickness of each of the upper and lower cover portions in the first direction is 20 µm or less, and
a sum of maximum thicknesses of the electrode layer and the conductive resin layer on the fifth or sixth surface of the ceramic body in a cross section of the ceramic body in the first and third directions is smaller than a minimum sum of thicknesses of the electrode layer and the conductive resin layer on the third or fourth surface of the ceramic body in the cross section of the ceramic body in the first and second directions.

2. The multilayer ceramic electronic component of claim 1, wherein the sum of maximum thicknesses of the electrode layer and the conductive resin layer in the cross section of the ceramic body in the first and third directions is 10 µm or more.

3. The multilayer ceramic electronic component of claim 1, wherein the maximum thickness of the conductive resin layer is 2 µm or more.

4. The multilayer ceramic electronic component of claim 1, wherein a thickness of each dielectric layer is 0.4 µm or less, and a thickness of each internal electrode is 0.4 µm or less.

5. The multilayer ceramic electronic component of claim 1, wherein a plating layer is disposed on the conductive resin layer.

6. The multilayer ceramic electronic component of claim 5, wherein the plating layer comprises at least one tin plating layer.

7. The multilayer ceramic electronic component of claim 6, wherein the plating layer further comprises at least one nickel plating layer.

8. The multilayer ceramic electronic component of claim 7, wherein the at least one tin plating layer is disposed on the at least one nickel plating layer.

9. A multilayer ceramic electronic component comprising:
a ceramic body including an active portion having a plurality of internal electrodes disposed to face each other with dielectric layers interposed therebetween to form capacitance, and upper and lower cover portions respectively disposed above an uppermost internal electrode and below a lowermost internal electrode of the plurality of internal electrodes in a first direction, the ceramic body having first and second surfaces opposing each other in the first direction, third and fourth surfaces opposing each other in a second direction and connected to the first and second surfaces, and fifth and sixth surfaces opposing each other in a third direction and connected to the first to fourth surfaces; and
external electrodes respectively disposed on the third and fourth surfaces of the ceramic body and each electrically connected to respective internal electrodes of the plurality of internal electrodes exposed through the third or fourth surfaces of the ceramic body, respectively,
wherein each external electrode includes an electrode layer electrically connected to the respective internal electrodes and a conductive resin layer disposed on the electrode layer, the conductive resin layer extending onto the fifth or sixth surface of the ceramic body,
a sum of maximum thicknesses of the electrode layer and the conductive resin layer on the fifth or sixth surface of the ceramic body in a cross section of the ceramic body in the first and third directions is 10 µm or more,
a thickness of each of the upper and lower cover portions in the first direction is 20 µm or less, and
the sum of maximum thicknesses of the electrode layer and the conductive resin layer on the fifth or sixth surface of the ceramic body in the cross section of the ceramic body in the first and third directions is smaller than a sum of minimum thicknesses of the electrode layer and the conductive resin layer on the third or fourth surface of the ceramic body in a cross section of the ceramic body in the first and second directions.

10. The multilayer ceramic electronic component of claim 9, wherein a sum of the maximum thickness of the electrode layer on the third or fourth surface of the ceramic body and the thickness of the conductive resin layer on the third or fourth surface in the cross section of the ceramic body in the first and second directions is 12 µm or more.

11. The multilayer ceramic electronic component of claim 9, wherein the maximum thickness of the conductive resin layer is 2 µm or more.

12. The multilayer ceramic electronic component of claim 9, wherein a thickness of each dielectric layer is 0.4 µm or less, and a thickness of each internal electrode is 0.4 µm or less.

13. The multilayer ceramic electronic component of claim 9, wherein a plating layer is disposed on the conductive resin layer.

14. The multilayer ceramic electronic component of claim 13, wherein the plating layer comprises at least one tin plating layer.

15. The multilayer ceramic electronic component of claim 14, wherein the plating layer further comprises at least one nickel plating layer.

16. The multilayer ceramic electronic component of claim 15, wherein the at least one tin plating layer is disposed on the at least one nickel plating layer.

* * * * *